US012767478B2

(12) United States Patent
Redmond

(10) Patent No.: US 12,767,478 B2
(45) Date of Patent: Oct. 20, 2026

(54) DEVICE FOR APPLYING AN ADHESIVE TO A LONGITUDINAL PRODUCT

(71) Applicant: Jack Redmond, Kastrup (DK)

(72) Inventor: Jack Redmond, Kastrup (DK)

( * ) Notice: Subject to any disclaimer, the term of this patent is extended or adjusted under 35 U.S.C. 154(b) by 305 days.

(21) Appl. No.: 18/268,446

(22) PCT Filed: Dec. 20, 2021

(86) PCT No.: PCT/DK2021/050376
§ 371 (c)(1),
(2) Date: Jun. 20, 2023

(87) PCT Pub. No.: WO2022/135642
PCT Pub. Date: Jun. 30, 2022

(65) Prior Publication Data

US 2024/0067487 A1 Feb. 29, 2024

(30) Foreign Application Priority Data

Dec. 21, 2020 (DK) ................................ 2020 01440

(51) Int. Cl.
*B65H 35/00* (2006.01)
*B29C 63/02* (2006.01)
(Continued)

(52) U.S. Cl.
CPC ......... *B65H 35/0033* (2013.01); *B29C 63/02* (2013.01); *H02G 1/00* (2013.01); *H02G 3/305* (2013.01)

(58) Field of Classification Search
CPC ...... B29C 63/02; B65H 35/0033; H02G 1/00; H02G 3/305; Y10T 156/1084; Y10T 156/1085
(Continued)

(56) References Cited

U.S. PATENT DOCUMENTS 5,948,201 A * 9/1999 Alveskog ................ H02G 1/00 156/289

FOREIGN PATENT DOCUMENTS

CN 110556743 B 11/2020
GB 2483950 A 3/2012
(Continued)

*Primary Examiner* — Philip C Tucker
*Assistant Examiner* — Jimmy R Smith, Jr.
(74) *Attorney, Agent, or Firm* — Elmore Patent Law Group, P.C.; Joseph C. Zucchero; Carolyn S. Elmore

(57) ABSTRACT

The invention relates to a device (100) for applying an adhesive (1) to a longitudinal product (4). The device comprises: a body (6) comprising a guide member (8); wherein said guide member (8) comprises a channel (10) for receiving and guiding a longitudinal product in relation to said guide member, said channel (10) is having a first end (12) and a second end (14); wherein said guide member (8) comprises a tape slot (16) for guiding an adhesive tape (2) into said channel; wherein said channel (10) comprises a guide surface (18); and wherein said tape slot (16) extends through at least part of the material of said guide member (8) and into said guide surface (18) of (10) said channel (10), thereby allowing feeding an adhesive tape (2) through the material of said guide member (8) and into said channel (10) of said guide member (8). The invention allows in a fast and efficient manner to apply an adhesive to a longitudinal product with the view to subsequently adhere that product to a surface.

19 Claims, 15 Drawing Sheets

(51) Int. Cl.
*H02G 1/00* (2006.01)
*H02G 3/30* (2006.01)

(58) Field of Classification Search
USPC ........................ 156/269, 270, 47, 51, 52, 53
See application file for complete search history.

(56) References Cited

FOREIGN PATENT DOCUMENTS

| | | | |
|---|---|---|---|
| WO | 2011105104 | A1 | 9/2011 |
| WO | 2015116446 | A2 | 8/2015 |

* cited by examiner

DEVICE FOR APPLYING AN ADHESIVE TO A LONGITUDINAL PRODUCT

FIELD OF THE INVENTION

The present invention relates in general to the field of electric installations.

More specifically, the present invention relates in a first aspect to a device for applying an adhesive to a longitudinal product.

In a second aspect, the present invention relates to a system comprising a device according to the first aspect in combination with a set of two or more guide members.

In a third aspect the present invention relates to a kit-of parts comprising a device according to the first aspect of the present invention in combination with a reel of adhesive tape.

In a fourth aspect the present invention provides a use of the device of the first aspect of the invention, or of a system according to the second aspect of the invention, or of a kit-of-parts according to the third aspect of the invention for applying an adhesive to a longitudinal product.

In a fifth aspect the present invention provides a method for applying an adhesive comprising a protective liner to a longitudinal product.

In a sixth aspect the present invention relates to a longitudinal product comprising an adhesive tape along at least part of its longitudinal extension, wherein said adhesive tape comprises an adhesive which is being protected by a protective liner; wherein said longitudinal product is being a tube or hose, such as a flexible tube or hose, such as a flexible tube for supplying medical quality air or oxygen to a patient.

In a seventh aspect the present invention relates to a longitudinal product comprising an adhesive tape which is being protected by a protective liner; wherein said longitudinal product furthermore comprises a protective tape covering at least part of said protective liner of said adhesive tape.

BACKGROUND OF THE INVENTION

Electric cables are used in a variety of situations for conducting an electric current between two or more connection points. Accordingly, for some uses, electric cables are hidden in installations in shielded off enclosures. In other uses electric cables are used in a way where they are freely exposed to the surroundings.

In many situations it is desired to fix electric cables to the structure at which they are present in order to keep some kind of ordering of the cables. For instance, it is customary in electric installation to fix the electric cables by using strips or clips for bundling two or more cables which at least partly follow a common path in the installation.

In private homes and in offices electric power cords are used for powering various types of electric equipment.

In order to avoid that power cords in a messy way are merely lying around on a floor, it is common practice to fix such power cords by using a number of small clips comprising a nail which may be rammed into a floor panel so as to fix the cord to that panel. In this way some ordering of the cord is attained.

Cables comprising an adhesive are known. The company Taperwire® provides loudspeaker cables having adhered thereto a strip of adhesive tape along the whole longitudinal extension of the cable. The adhesive tape is covered with a protective liner for protecting the adhesive thereof. Upon use, the user simply removes the protective liner in order to expose the adhesive surface of the adhesive. Subsequently, the adhesive speaker cable can be adhered to a surface, such as a wall or a floor panel.

As the type and dimensions of a cable highly depend on the purpose of its use (such as number of conductors, requirement to magnitude of current to be conducted, necessity of shielding mesh against electromagnetic interference etc.), a speaker cable as the ones supplied by Taperwire® may not suit every purpose of conducting electric current.

Accordingly, a need exists for a device which enables applying an adhesive to an existing cable having predetermined dimensions and geometry.

Adhering an adhesive to longitudinal products other than cables could in general be desirable as well. Such products could be rubber seals, flexible tubes or hoses, extruded aluminium profiles, trims for windows or floor panels or the like.

Within the medical field, it would be especially desirable to be able to adhere flexible air tubes, such as tubes for supplying medical quality air or oxygen to a patient, to a surface.

Hereby, a patient in need of oxygen from an oxygen container can have an oxygen container stored at a specific location in a room and convey the oxygen gas through tubes that are adhered to fixed structures, such as a wall or part of a bed or the like to the patient.

Accordingly, in this way the tubing can be neatly arranged from its source of the oxygen container to the patient.

Accordingly, there exist a general need for a device that allows application of an adhesive to a longitudinal product It is an objective of the present invention to provide technology fulfilling this need.

BRIEF DESCRIPTION OF THE INVENTION

This object is fulfilled by the present in its various aspects.

Accordingly, the present invention relates in a first aspect to a device for applying an adhesive to a longitudinal product, said device comprises:

- a body comprising a guide member; wherein said guide member comprises a channel for receiving and guiding a longitudinal product in relation to said guide member, said channel is having a first end and a second end;
- wherein said guide member comprises a tape slot for guiding an adhesive tape into said channel;
- wherein said channel comprises a guide surface; and wherein said tape slot extends through at least part of the material of said guide member and into said guide surface of said channel, thereby allowing feeding an adhesive tape through the material of said guide member and into said channel of said guide member.

In a second aspect the present invention relates to a system comprising a device according to the first aspect of the invention in combination with a set of two or more guide members, wherein in respect of two or more of said two or more guide members, the geometries and/or dimensions of said channel are different.

In a third aspect the present invention relates to a kit-of parts comprising a device according to the first aspect of the present invention in combination with one or more reels of adhesive tape; and wherein the geometry and the dimensions of said adhesive tape is adapted to the geometry and the dimensions of the tape slot of a guide member of said device; optionally further in combination with one or more reels of protective tape.

In a fourth aspect the present invention provides a use of a device according to the first aspect of the present invention; or of a system according to the second aspect of the present invention, or of a kit-of-parts according to the third aspect of the present invention for applying an adhesive to a longitudinal product.

In a fifth aspect the present invention provides method for applying an adhesive to a longitudinal product, wherein said method comprises the following steps:

i) providing a device according to the first aspect of the invention;
ii) via said tape slot inserting an end of the adhesive tape into the channel of the guide member of said device in such a way that the exposed adhesive of said adhesive tape, upon entering said channel, faces said first end of said channel;
iii) arranging said longitudinal product in said channel of said guide member;
iv) displacing said longitudinal product along said channel of said guide member, in a direction from said first end of said channel to said second end of said channel, thereby making said exposed adhesive of said adhesive tape adhere to said longitudinal product along a desired extension thereof;
v) cutting the adhesive tape once the desired extension of application has been reached.

In a sixth aspect the present invention relates to a longitudinal product comprising an adhesive tape along at least part of its longitudinal extension, wherein said adhesive tape comprises an adhesive which is being protected by a protective liner; wherein said longitudinal product is being a tube or hose, such as a flexible tube or hose, such as a flexible tube for supplying medical quality air or oxygen to a patient.

In a seventh aspect the present invention relates to a longitudinal product comprising an adhesive tape along at least part of its longitudinal extension, wherein said adhesive tape comprises an adhesive which is being protected by a protective liner; wherein said longitudinal product furthermore comprises a protective tape covering at least part of said protective liner of said adhesive tape.

The present invention in its various aspects allows in an easy and efficient manner to apply an adhesive to a longitudinal product with the view to subsequently fasten, by adherence via said adhesive, to a surface.

DETAILED DESCRIPTION OF THE INVENTION

Figure 1:
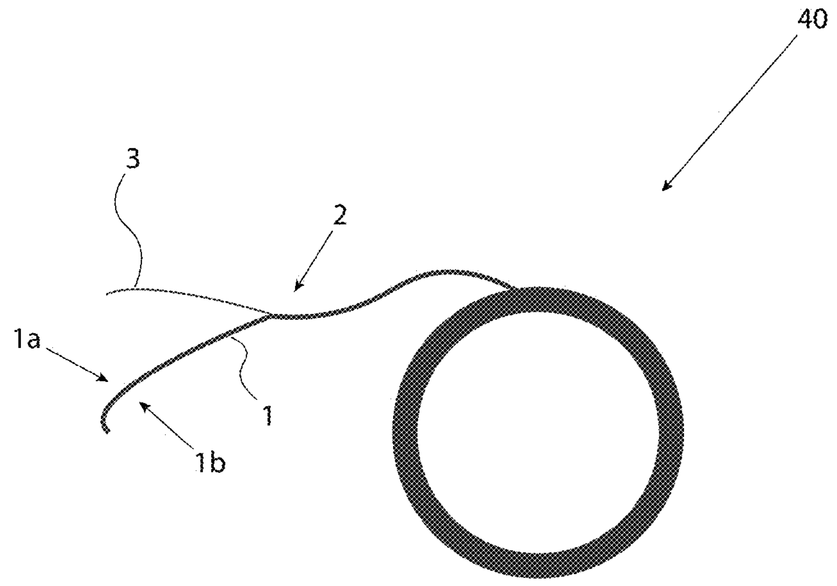
FIG. 1 is a plan view illustrating the concepts of adhesive, adhesive tape and reel of adhesive tape according to the preset invention.

The First Aspect of the Present Invention

The present invention relates in a first aspect to a device for applying an adhesive to a longitudinal product, said device comprises:

a body comprising a guide member; wherein said guide member comprises a channel for receiving and guiding a longitudinal product in relation to said guide member, said channel is having a first end and a second end;

wherein said guide member comprises a tape slot for guiding an adhesive tape into said channel;

wherein said channel comprises a guide surface; and wherein said tape slot extends through at least part of the material of said guide member and into said guide surface of said channel, thereby allowing feeding an adhesive tape through the material of said guide member and into said channel of said guide member.

Accordingly, with the device according to the first aspect of the present invention it is possible to guide a longitudinal product, such as a flexible longitudinal product, such as an electric cable or a data cable, or a rigid product, through or along the guide member of the device. The guide member itself is designed in such a way that it allows an adhesive tape provided with a protective liner to be guided to the longitudinal product and adhered thereto as the longitudinal product is being displaced through or along the guide member. Hereby the longitudinal product will be applied with a length of adhesive having a protective liner adhered thereto. Once, the longitudinal product is ready for being adhered to a surface, the protective liner of the protective tape now applied to the longitudinal product, is removed, thereby exposing the adhesive of the adhesive tape. The longitudinal product may in this state be adhered to a surface.

It should be noted that the device during use is configured for applying an adhesive tape having a protective liner onto the longitudinal product. But as the adhesive tape comprises an adhesive (which is protected by a protective liner) it should within the scope of the present description and the appended claims be understood that the application of the adhesive tape onto a longitudinal product also implies application of an adhesive onto that longitudinal product.

In an embodiment of the first aspect of the present invention the channel of said guide member is having an essentially linear extension. Thereby even a rigid and linearly extending longitudinal product may be applied with an adhesive with the device.

Alternatively, the channel of said guide member may have a non-linear extension.

In an embodiment of the first aspect of the present invention the channel of said guide member is a through-going channel extending through the material of said guide member; or is a channel in a form of a recess arranged at a surface of said guide member.

Providing the channel of the guide member as a through-going channel improves guidance of the longitudinal product which is to be applied with an adhesive. On the other hand, providing the channel of the guide member as a recess arranged at a surface of said guide member makes it easier to arrange the longitudinal product in relation to the channel In an embodiment of the first aspect of the present invention the tape slot extends through the material of said guide member to said channel in a direction essentially perpendicular to the linear extension of said channel, such as in a direction deviating no more than ±30° from a perpendicular direction to the linear extension of said channel.

Hereby it is ensured that the adhesive tape can be guided into the space of the longitudinal product without too much friction between the adhesive tape and the guide member.

In an embodiment of the first aspect of the present invention the guide member is integrated with said body of said device.

This embodiment ensures a cost-efficient production of the device.

In a special embodiment, the guide member and the body of the device may even be the same entity.

In an embodiment of the first aspect of the present invention the guide member is configured to be detachable mounted to said body of said device.

This embodiment allows for interchangement of guide members so that the device is suitable for application of an adhesive tape to different longitudinal products having a wide range of different cross-sections. By making sure that the guide member used with the device can "accommodate" the longitudinal product which is to be applied with adhesive tape, almost any type of longitudinal product can be applied with an adhesive.

In an embodiment of the first aspect of the present invention the body of said device comprises a body attachment means, and said guide member also comprises guide member attachment means; wherein said body attachment means and said guide member attachment means are adapted to be able to detachably enter into engagement with each other, thereby enabling exchange of said guide member on said body.

Hereby the interchangeable guide members can be fastened to and removed from the body of the device with the view to fit a specific guide member which fits the cross-section of the longitudinal product to be applied with adhesive tape.

In an embodiment of the first aspect of the present invention the guide member comprises a first guide member part and a second guide member part.

In an embodiment of this embodiment the guide member is being divided into said first guide member part and said second guide member part at an interphase, said interphase is being arranged along said channel, thereby intersecting said channel along a longitudinal direction thereof.

These two embodiments allow for easy arrangement of the longitudinal product in the channel of the guide member. In case the longitudinal product is having an end which is too large to fit in the channel, this embodiment ensures that parts other than the end of that product can be applied with an adhesive.

In an embodiment of the first aspect of the present invention the first guide member part comprises a first guide member engagement means, and wherein said second guide member part comprises a second guide member engagement means; wherein said first guide member engagement means and said second guide member engagement means are configured to detachably enter into engagement with each other.

Hereby any lateral movement in relation to each other in ensured in respect of the first guide member part and the second guide member part.

In an embodiment of the first aspect of the present invention the body comprises a first body member and a second body member; wherein said first body member and said second body member are being attached to each other in a pivoting fashion around a pivoting point, thereby forming two jaws which, by rotation relative to each other, are configured to enable changing the configuration of said device between an open configuration and a closed configuration.

This embodiment allows easy arrangement of the longitudinal product into the channel of the guide member in case the guide member comprises two parts, wherein one guide member part is attached to the first body member and wherein a second guide member part is being attached to the second body member.

In an embodiment of the first aspect of the present invention the first body member comprises first body attachment means; and wherein said second body member comprises second body attachment means; wherein said first guide member part comprises a first guide member attachment means, wherein said second guide member part comprises a second guide member attachment means; wherein said first body attachment means is being configured to detachably enter into engagement with said first guide member attachment means; and wherein said second body attachment means is being configured to detachably enter into engagement with said second guide member attachment means, wherein said channel thereby is being formed upon bringing said device into its closed configuration.

This embodiment ensures that each of the two guide member parts may be attached to its respective body member.

In an embodiment of the first aspect of the present invention the said first body member comprises first body attachment means, wherein said first guide member part comprises a first guide member attachment means; wherein said first body attachment means is being configured to detachably enter into engagement with said first guide member attachment means; and wherein said second guide member part is integrated into said second body member.

This embodiment is intended for only having an exchangeable guide member part in the first body member, whereas the second guide member part may merely constitute a support surface for the first guide member part.

In an embodiment of the first aspect of the present invention the tape slot is a closed tape slot allowing access into said channel only from an end opening of said tape slot arranged opposite to the entry of said tape slot into said channel in said guide member; or wherein said tape slot is an open tape slot, further allowing access into said channel along the extension of said tape slot.

The latter embodiment allows sideways arrangement of the adhesive tape into the tape slot which may be advantageous.

In an embodiment of the first aspect of the present invention the channel is having a cross-sectional geometry selected from the group of geometries of: a circle, an oval, a triangle, a rectangle, such as a square, or a hexagon.

Such geometries fit corresponding geometries of a longitudinal product to be applied with an adhesive.

In an embodiment of the first aspect of the present invention the cross-section of said channel is having an extension in the direction defining the largest extension of: 3-300 mm, such as 5-250 mm, for example 10-200 mm, such as 15-150 mm, e.g. 20-120 mm, for example 25-100 mm, such as 30-80 mm, for example 40-70 mm or 50-60 mm; and/or wherein said channel 10 is having an extension in the direction defining the smallest extension of: 3-300 mm, such as 5-250 mm, for example 10-200 mm, such as 15-150 mm, e.g. 20-120 mm, for example 25-100 mm, such as 30-80 mm, for example 40-70 mm or 50-60 mm.

Such dimensions fit corresponding dimensions of the cross-section of a longitudinal product to be applied with an adhesive.

In an embodiment of the first aspect of the present invention the cross-section of said channel of said guide member comprises an essential circular curve comprising a notch, wherein said notch extends away from the center of said circular curve and into the material of said guide member.

In an embodiment of this embodiment said notch extends all the way along the longitudinal direction of said channel.

In an embodiment of this embodiment said notch is arranged at that longitudinal part of the surface of said channel corresponding to the location of the entry of said tape slot.

These three embodiments prevent any rotational movement of the longitudinal product having a circular cross-section upon being displaced along the guide member, thereby ensuring a linear application of the adhesive onto that product.

In an embodiment of the first aspect of the present invention the first body member and/or said second body member comprises a longitudinal recess, thereby forming said guide member as an integral part of said body; wherein said recess(s) thereby define(s) said channel, when said first body member and said second body member are being brought into their closed configuration.

In an embodiment of this embodiment the first body member and the second body member comprises engagement means configured to enter into engagement with each other upon bringing said first body member and said second body member into their closed configuration, thereby preventing any lateral movement of the first body member and said second body member relative to each other when being in their closed configuration.

These two embodiments represent a cost-efficient design of the device having no interchangeable guide members.

In an embodiment of the first aspect of the present invention the device furthermore comprises a tape reel holder for holding a reel of adhesive tape.

Hereby is avoided that the adhesive tape to be applied to the longitudinal product ends up being entangled upon application thereof.

In an embodiment of this embodiment said tape reel holder is having an orientation, relative to said tape slot of said guide member in a way enabling that once being loaded with a reel of adhesive tape, said reel of adhesive tape defines a plane which essentially intersects said tape slot.

Hereby the adhesive tape can be guided to the tape slot in the guide member without excessive friction.

In another embodiment of this embodiment said tape reel holder comprises a post having a proximal portion and a distal portion, wherein said proximal portion is being attached to said body of said device and wherein said distal portion comprises reel holding means, wherein said reel holding means is configured to allow a tape reel, once being mounted on said tape reel holder, to rotate relative to said post so as to be loosely arranged on the reel holding means.

This embodiment ensures a suitable way of mounting the reel of adhesive tape to the device during application of an adhesive tape to a longitudinal product.

In an embodiment of the first aspect of the present invention the device further comprising a roller, wherein said roller comprises first roller attachment means, and wherein said body comprises second roller attachment means, wherein said first roller attachment means are configured to detachably enter into engagement with said second roller attachment means.

The roller allows for applying pressure to the longitudinal product which has been applied with an adhesive upon mounting by adherence of that longitudinal product onto a surface.

In an embodiment of the first aspect of the present invention the guide member comprises an auxiliary tape slot for guiding a protective tape into said channel, said auxiliary tape slot extends through the material of the guide member into said channel at a position next to the said tape slot.

A protective tape prevents deterioration of the adhesive power of the adhesive of the adhesive tape during prolonged storage, such as being caused by physical impact to the longitudinal product which otherwise may imply that the protective liner of the protective tape separates from the adhesive.

In an embodiment of the first aspect of the present invention the device further comprising a tape reel holder for said protective tape.

The Second Aspect of the Present Invention

In a second aspect the present invention relates to a system comprising a device according to the first aspect of the invention in combination with a set of two or more guide members, wherein in respect of two or more of said two or more guide members, the geometries and/or dimensions of said channel are different.

The Third Aspect of the Present Invention

In a third aspect the present invention relates to a kit-of parts comprising a device according to the first aspect of the present invention in combination with one or more reels of adhesive tape; and wherein the geometry and the dimensions of said adhesive tape is adapted to the geometry and the dimensions of the tape slot of a guide member of said device; optionally further in combination with one or more reels of protective tape.

The Fourth Aspect of the Present Invention

In a fourth aspect the present invention provides a use of a device according to the first aspect of the present invention; or of a system according to the second aspect of the present invention, or of a kit-of-parts according to the third aspect of the present invention for applying an adhesive to a longitudinal product.

The Fifth Aspect of the Present Invention

In a fifth aspect the present invention provides method for applying an adhesive to a longitudinal product, wherein said method comprises the following steps:

i) providing a device according to the first aspect of the invention;

ii) via said tape slot inserting an end of the adhesive tape into the channel of the guide member of said device in such a way that the exposed adhesive of said adhesive tape, upon entering said channel, faces said first end of said channel;

iii) arranging said longitudinal product in said channel of said guide member;

iv) displacing said longitudinal product along said channel of said guide member, in a direction from said first end of said channel to said second end of said channel, thereby making said exposed adhesive of said adhesive tape adhere to said longitudinal product along a desired extension thereof;

v) cutting the adhesive tape once the desired extension of application has been reached.

In one embodiment of the method according to the fifth aspect, said longitudinal product is a flexible product, such as an electric cable, a data cable, a rubber seal; a tube or hose, such as a flexible tube or hose, such as a flexible tube for supplying medical quality air or oxygen to a patient; or wherein said longitudinal product is a non-flexible product, such as, extruded aluminium profile, a trim for windows or for floor panels.

The Sixth Aspect of the Present Invention

In a sixth aspect the present invention relates to a longitudinal product comprising an adhesive tape along at least part of its longitudinal extension, wherein said adhesive tape comprises an adhesive which is being protected by a protective liner; wherein said longitudinal product is being a tube or hose, such as a flexible tube or hose, such as a flexible tube for supplying medical quality air or oxygen to a patient.

The Seventh Aspect of the Present Invention

In a seventh aspect the present invention relates to a longitudinal product comprising an adhesive tape along at least part of its longitudinal extension, wherein said adhesive tape comprises an adhesive which is being protected by a protective liner; wherein said longitudinal product furthermore comprises a protective tape covering at least part of said protective liner of said adhesive tape.

In order to better illustrate the present invention and various embodiment thereof, reference is now made to the figures.

FIG. 1 is a plan view illustrating the concepts of adhesive, adhesive tape and reel of adhesive tape according to the preset invention.

FIG. 1 shows the reel 40 of adhesive tape 2. The reel 40 comprises an adhesive 1 which on one surface has been provided with a protective liner 3 and which has been wound into a reel. Upon unwinding the tape 2, the tape will comprise an exposed adhesive surface 1*b* of the adhesive 1. An opposite surface 1*a* of the adhesive 1 is covered with the protective liner 3.

When removing the protective liner 3 the adhesive surface 1*a* of the adhesive will be exposed, thus leaving the adhesive 1 exposed on one side 1*a*.

Examples of adhesive tapes which can be used with the present invention are of the type: foamed acrylic adhesive. Such tapes are marketed under the name of: VHB tape from 3M®, Tesa 4965, Nitto 5703LE or A7040CR from the Crown Adhesive company.

Figure 2:
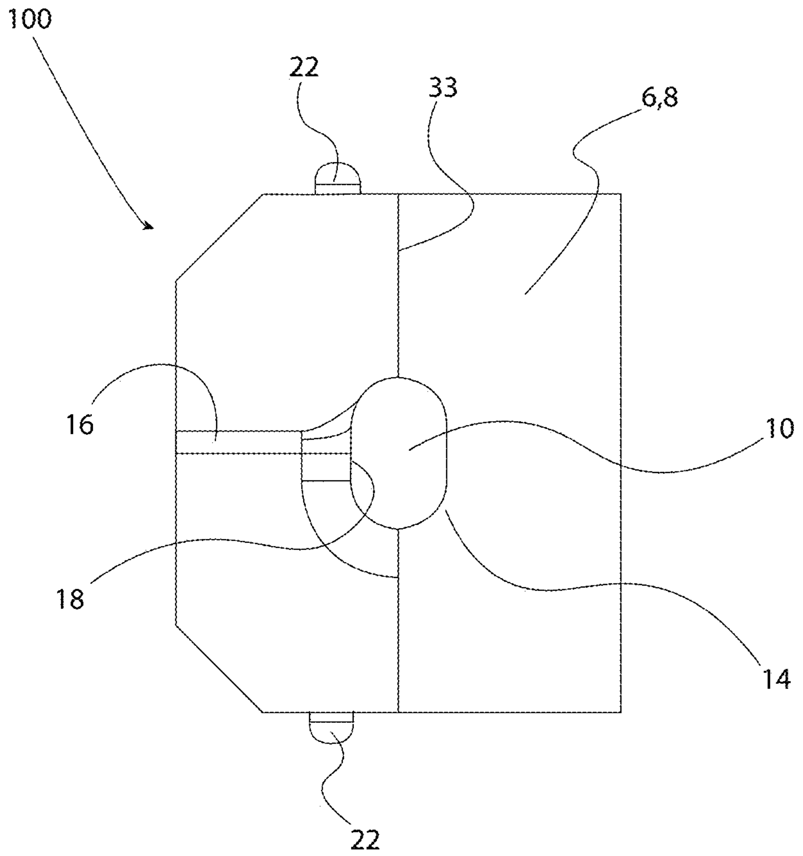
FIG. 2 is a plan view illustrating one embodiment of the device according to the invention.

FIG. 2 is a plan view illustrating one embodiment of the device according to the invention in one of its most simple embodiments. The device is for applying an adhesive to a longitudinal product.

FIG. 2 shows the device 100 comprising a body 6 which comprises a guide member 8.

The guide member 8 comprises a channel 10 in the form of a through-going channel for receiving and guiding a longitudinal product through said guide member. The through-going channel 10 is having a first end 12 and a second end 14. The second end 14 of the through-going channel 10 faces in FIG. 2 the viewer and the first end 12 is arranged opposite to the second end 14. The through-going channel 10 is for receiving and guiding a longitudinal product through the guide member 8.

It is seen in FIG. 2 that the though-going channel 10 comprises an inner guide surface 18. It is also seen that a tape slot 16 extends into the inner guide surface 18 of the through-going channel 10. Thereby it is possible to feed an adhesive tape 2, via the tape slot 16, into the through-going channel 10 of the guide member 8.

In the process of applying an adhesive to a longitudinal product an end of the adhesive tape 2 is introduced into the tape slot 16 and it is pushed further into the though-going channel 10 of the guide member 8 in such an orientation that the exposed adhesive 1,1*b* of the adhesive tape 2 faces the first end 12 of the through-going channel 10.

Subsequently, an end of a longitudinal product 4 is inserted into the first end 12 of the through-going channel 10 of the guide member 8.

By displacing the longitudinal product 4 through the through-going channel 10 of the guide member 8, in a direction from said first end 12 to said second end 14, the exposed adhesive 1 of the adhesive tape 2 will adhere to the longitudinal product 4. This is brought about by help of the inner guide surface 18 of the through-going channel 10 in that this inner guide surface 18 aids in pressing the exposed adhesive 1 of the adhesive tape 2 against the longitudinal product.

Once a desired length of the longitudinal product 4 has been applied with adhesive tape 2 the adhesive tape 2 is cut and the longitudinal product can be removed from the device 100.

Hereby the longitudinal product will be applied with an adhesive, where one surface 1*b* of the adhesive 1 adheres to the longitudinal product 4 and the opposite surface 1*a* of the adhesive 1 is protected by a protective liner 3.

When the longitudinal product 4 is to be adhered to a surface, the protective liner 3 is simply removed, thereby exposing the adhesive surface 1*a* of the adhesive 1, and by pressing this exposed adhesive against a surface, the longitudinal product 4 will be adhered to that surface.

FIG. 2 shows that the through-going channel 10 is having an essentially linear extension through the guide member 8.

FIG. 2 also shows that the tape slot 16 extends into the through-going channel 10 in a direction essentially perpendicular to the linear extension of the through-going channel 10.

Figure 3:
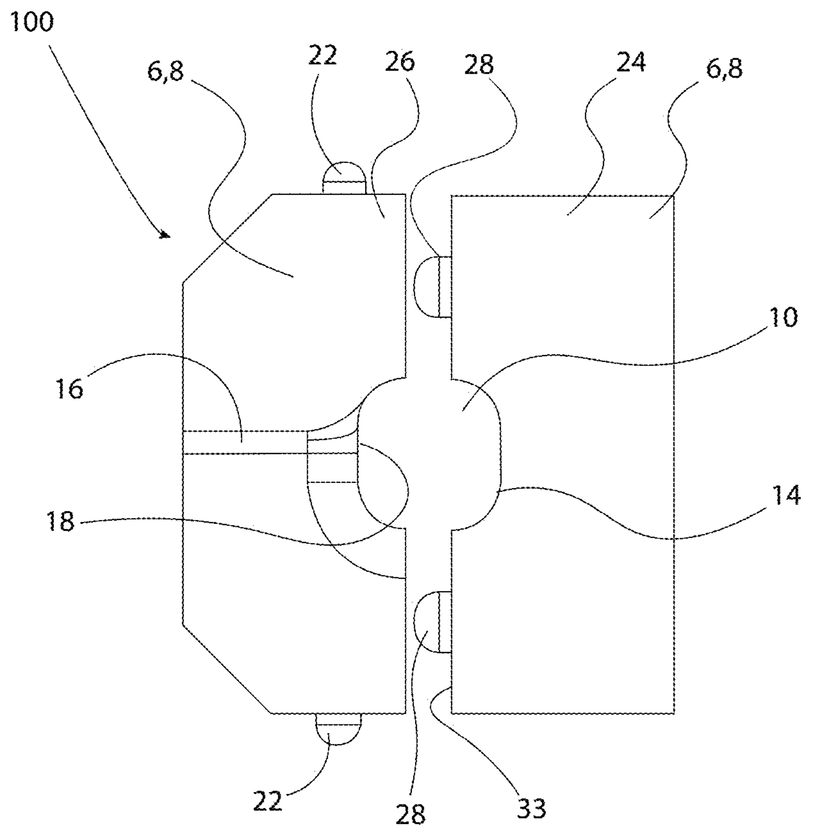
FIG. 3 is a plan view illustrating the embodiment of FIG. 2 in a disassembled state.

FIG. 3 is a plan view illustrating the embodiment of FIG. 2 in a disassembled state. Accordingly, FIG. 3 shows that the guide member 8 of device 100 comprising the body 6 can be taken apart in two separate guide member parts, viz. a first guide member part 24 and a second guide member part 26.

FIG. 3 illustrates that the first guide member part 24 comprises a first guide member engagement means 28. These first guide member engagement means 28 are configured to enter into engagement with a second guide member engagement means 30 in the form of corresponding holes arranged in the second guide member part 26 (not seen in FIG. 3).

Providing these guide members with engagement means 28,30 allows the two guide member parts 24,26 to be attached to each other so as allowing that these guide member parts 24,26 retain their orientation relative to each other.

FIGS. 2 and 3 show that the guide member 8 is being divided into the first guide member part 24 and said second guide member part 26 at an interphase 33, the interphase is being arranged along the channel 10.

Figure 4A:
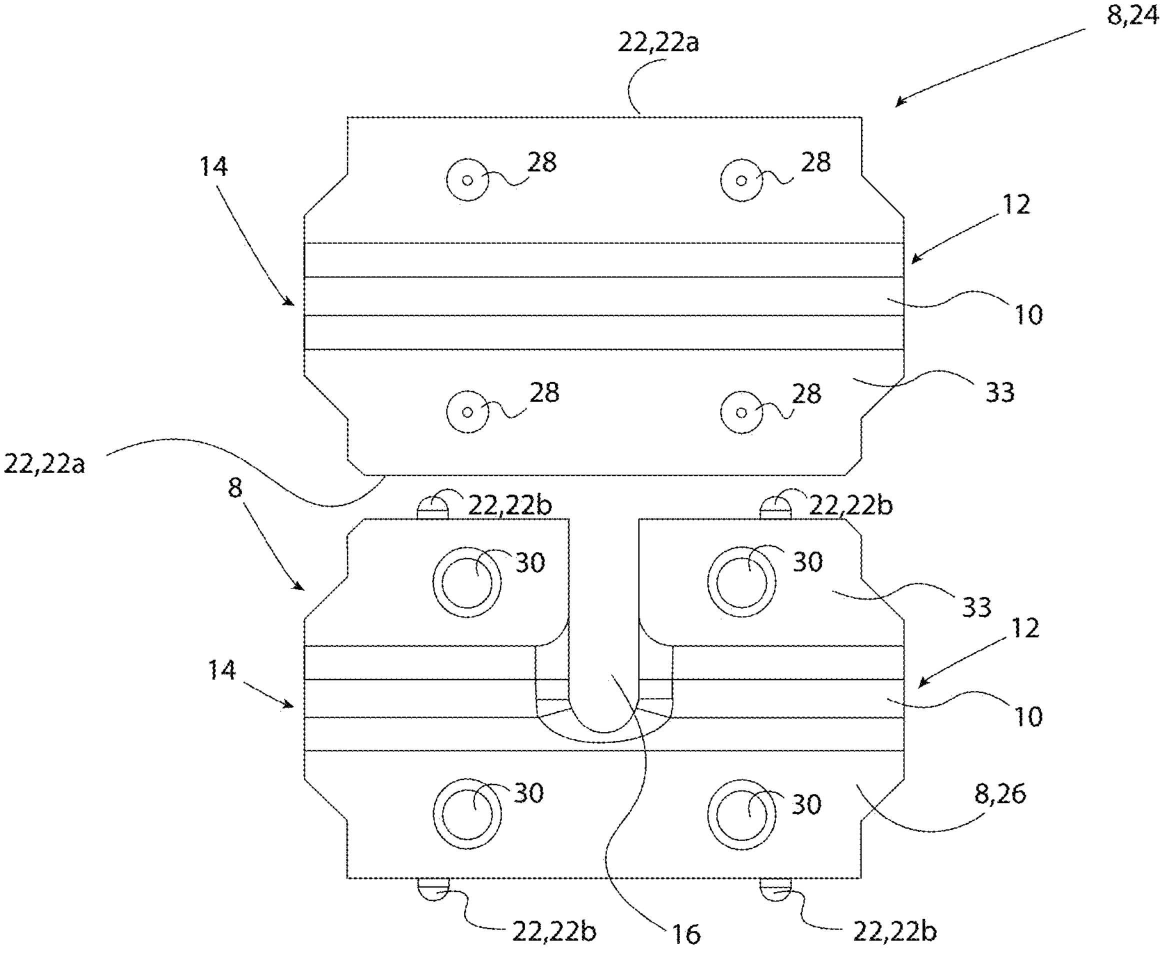
FIG. 4*a* is a plan view illustrating the first guide member part and the second guide member part of the embodiment of the invention shown in FIGS. 2 and 3.

FIG. 4*a* is a plan view illustrating the first guide member part 24 and the second guide member part 26 of the guide member 8 in a disassembled state. Again, it is seen that the guide member 8 comprising the two guide member parts 24 and 26 comprises a channel 10 having a first end 12 and a second end 14.

The two guide member parts 24 and 26 are configured to be assembled into an assembled guide member 8 by making the interface surface 33 of the two guide member parts 24 and 26 face each other.

In doing so, the protrusions of the first guide member engagement means 28 will engage with the holes 30 of the second guide member engagement means 30, thereby holding the first guide member part 24 and the second guide member part 26 of the guide member 8 into a fixed position in relation to each other.

FIG. 4*a* also shows the second guide member attachment means 22,22*b* of the second guide member part 26. These means 22,22*b* are configured to engage with body attachment means 20 of the body 6 of the device 100.

The first guide member attachment means 22,22*a* of the first guide member part 24 simply comprises the shape of the sides of the second guide member part 24 which will enter into engagement with the body 6 of the device 100 and will be hold in place solely by friction.

Figure 4B:
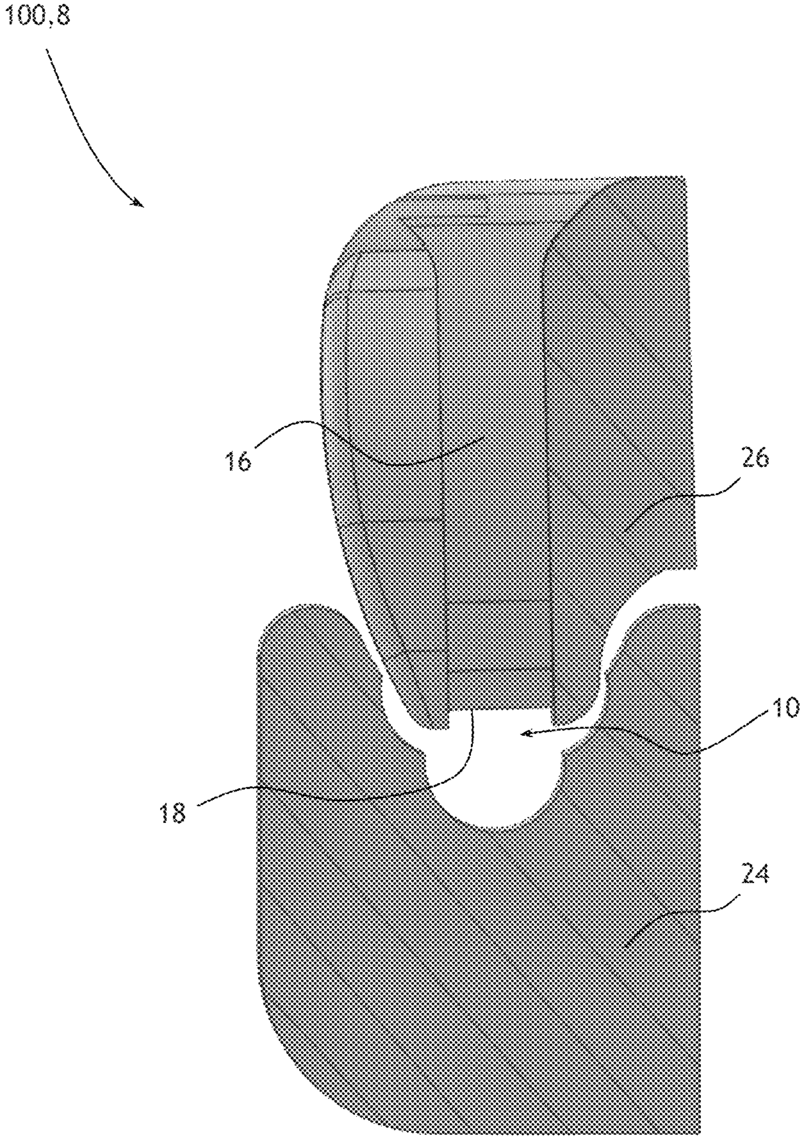
FIG. 4*b* is a cross-sectional view illustrating the first guide member part and the second guide member part of an alternative embodiment of the first aspect of the invention.

FIG. 4*b* is a cross-sectional view illustrating the first guide member part and the second guide member part of an alternative embodiment of the first aspect of the invention.

FIG. 4*b* shows the first guide member part 24 and the second guide member part 26 of a guide member 8, which are shaped so as form the channel 10 for a longitudinal product along a surface of each of the two guide member parts 24,26.

Figure 5:
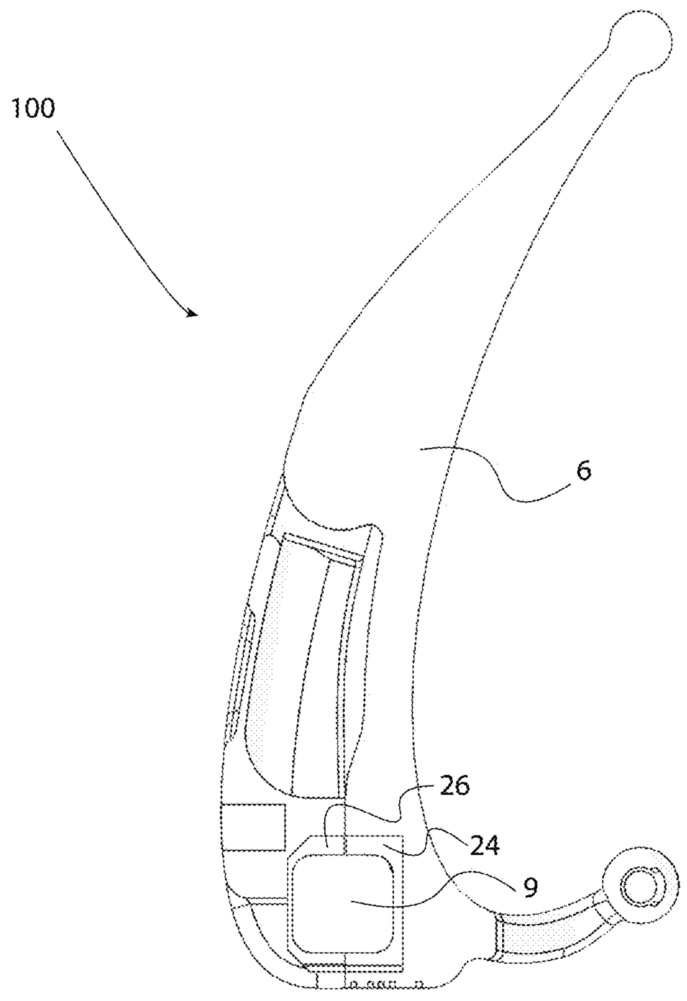
FIG. 5 is a cross-sectional view illustrating another embodiment of the device of the invention.

FIG. 5 is a cross-sectional view illustrating another embodiment of the device of the invention.

FIG. 5 shows the device 100 comprising the body 6. The device 100 in FIG. 5 comprises the guide member area 9 for accommodating the detachable guide member 8 illustrated in FIGS. 2, 3 and 4.

Figure 6:
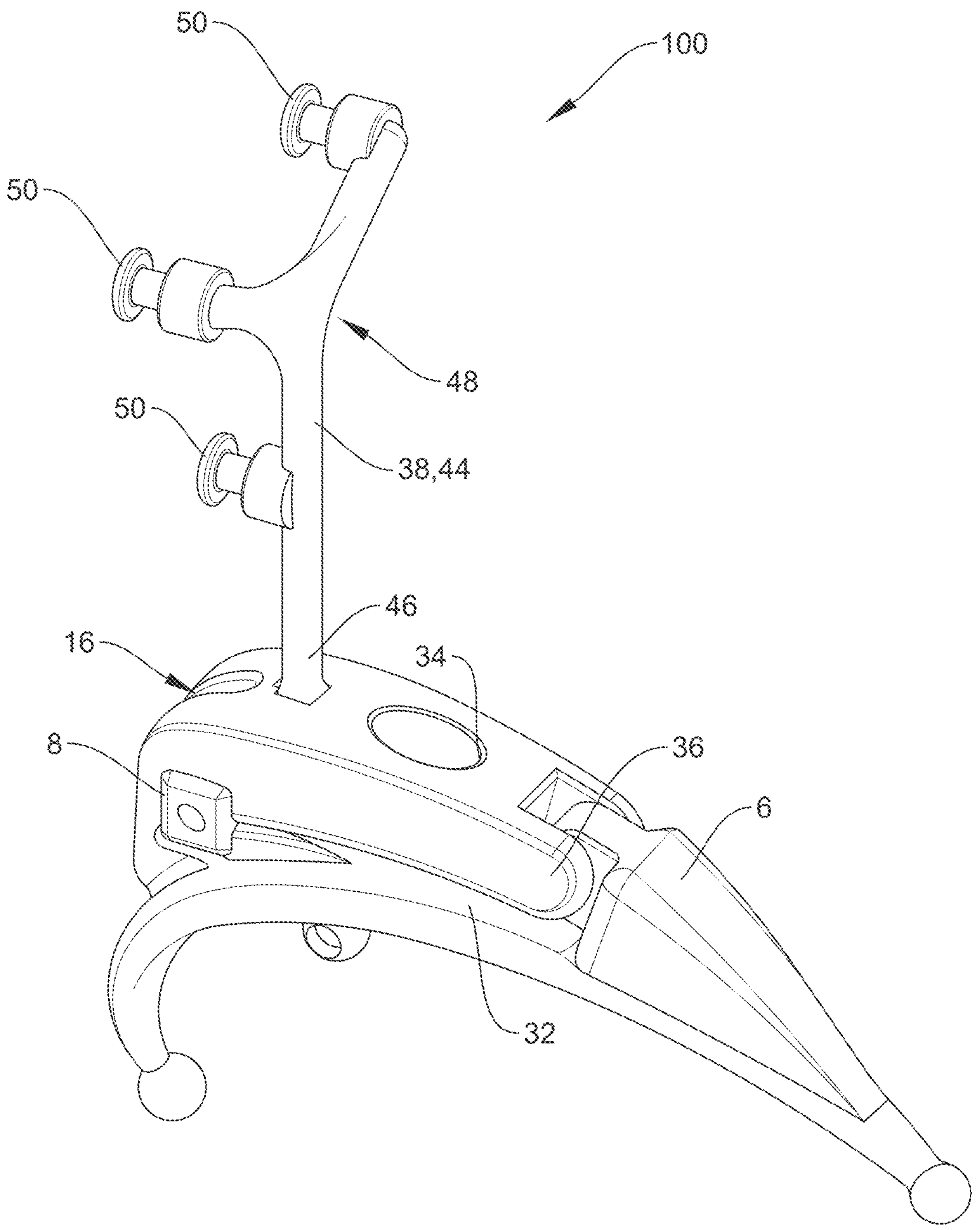
FIG. 6 is a perspective view illustrating yet another embodiment of the device of the invention.

FIG. 6 is a perspective view illustrating yet another embodiment of the device of the invention.

The embodiment shown in FIG. 6 corresponds to the embodiment of FIG. 5. However, in FIG. 6 the device 100 has been provided with a tape reel holder 38 for holding a reel 40 of adhesive tape 2. The tape reel holder comprises a post 44 having a proximal portion 46 and a distal portion 48, wherein the proximal portion is being attached to the body 6 of the device. It is seen that the distal portion 48 comprises reel holding means 50. The reel holding means is configured to allow a tape reel, once being mounted on the tape reel holder 38, to rotate relative to the post 44.

The tape reel holder 38 is having an orientation relative to the tape slot 16 of the guide member 8 in a way enabling that once being loaded with a reel 40 of tape 2, the reel 40 of tape defines a plane which essentially intersects the tape slot 16.

Hereby, the adhesive tape 2 can be guided without excessive bends into the tape slot 16.

The body 6 of the device illustrated in FIG. 6 comprises a first body member 32 and a second body member 34. The first body member 32 and the second body member 34 are pivotally mounted to each other around a pivoting point 36. Hereby the device 100 can attain an open configuration and a closed configuration.

Figure 7:
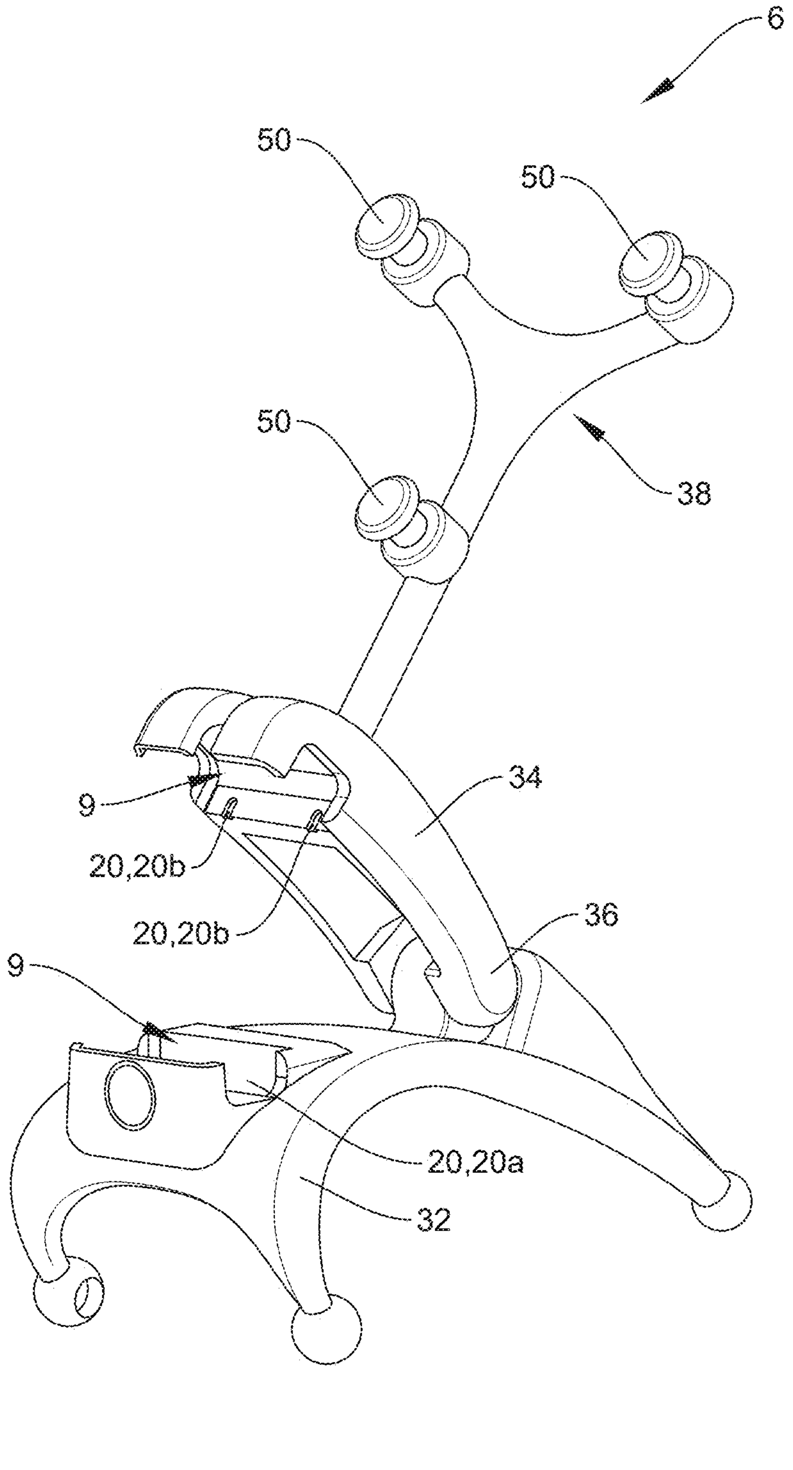
FIG. 7 is a perspective view illustrating the embodiment of FIG. 6 as seen from another perspective and without the guide member.

This is further illustrated in FIG. 7.

FIG. 7 is a perspective view illustrating the embodiment of FIG. 6 as seen from another perspective and without the guide member 8.

FIG. 7 shows that the first body member 32 and a second body member 34 been pivotally rotated slightly in relation to each other around pivoting point 36. Hereby the first body member 32 and the second body member 34 are brought into an open configuration in relation to each other.

It is seen in FIG. 7 that the first body member 32 and the second body member 34 each comprises a guide member area 9 for accommodating a first guide member part 24 and a second guide member part 26, respectively. The shape of the lower guide member area 9 defines the first body attachment means 20,20*a* for holding the first guide member part 26 into place solely via friction.

The upper guide member area 9 comprises the second body attachment means 20,20*b* for holding the second guide member part 26 into place.

This embodiment is advantageous because it allows a longitudinal product to be applied with an adhesive even though that product is having an end which is too big to enter the first or second end 12,14 of the channel 10 of the guide member 8. In such a situation the longitudinal product is arranged along the longitudinal channel 10 between the first guide member part 24 and the second guide member part 26 in their open configuration. Subsequently these two guide member parts 24,26 will be brought together in their closed configuration and the application of the adhesive 1 can commence by displacing the longitudinal product 4.

Figure 8:
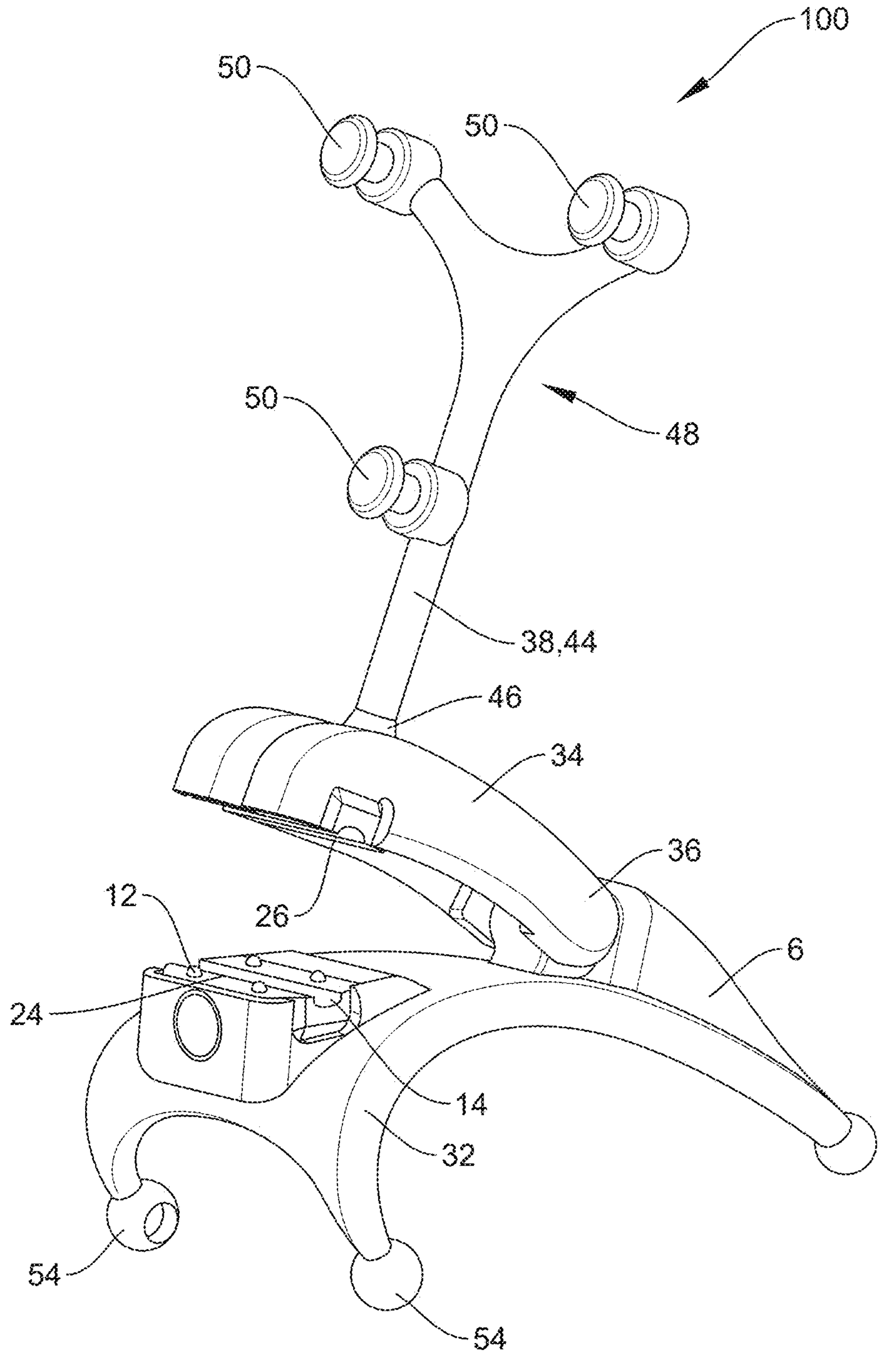
FIG. 8 is a perspective view illustrating the embodiment of FIG. 7 with the guide member attached.

FIG. 8 is a perspective view of the embodiment illustrated in FIG. 7. In FIG. 8 the first guide member part 24 and the second guide member part 26 have been inserted into the respective guide member area 9 of the first body member 32 and the second body member 34, respectively.

Figure 9:
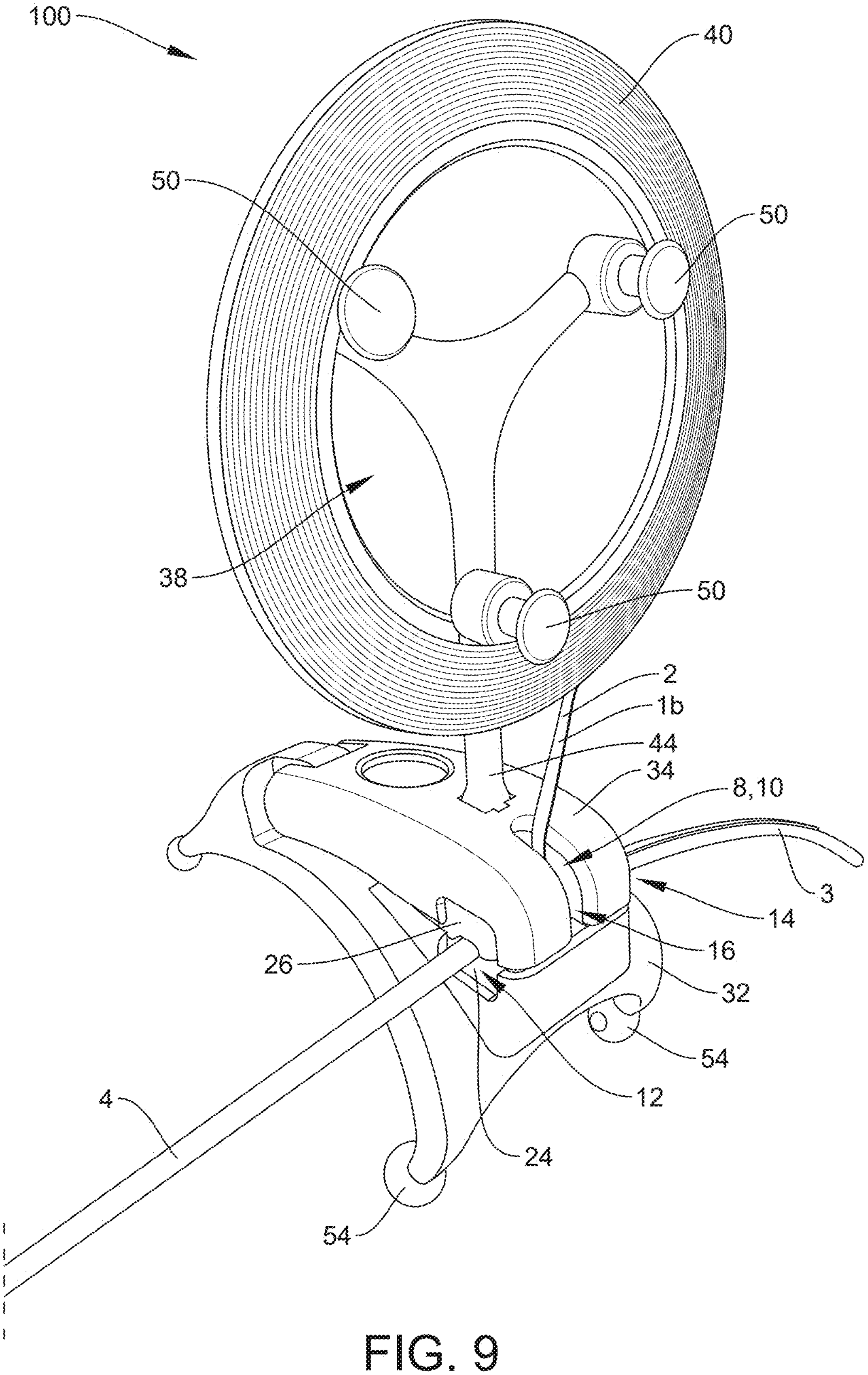
FIG. 9 is a photograph illustrating the process of applying an adhesive to a longitudinal product by using the device of the present invention.

FIG. 9 is a photograph illustrating the use of the device according to the first aspect in the process of applying an adhesive to a longitudinal product.

FIG. 9 shows the device 100 comprising a first body member 32, a second body member 34 and a tape reel holder 38 comprising a post 44 and reel holding means 50 for holding a reel 40 of adhesive tape 2. The device also comprises a guide member 8 comprising guide member parts 24, 26 (barely seen in FIG. 9 between the front of first body member 32 and second body member 34).

In FIG. 9 it is seen that the adhesive tape 2 has been pulled off the reel 40 and guided into the tape slot 16 of the guide member 8. Hereby an adhesive surface 1*b* of the adhesive tape 2 will be exposed. The adhesive surface 1*b* of the adhesive tape 2 faces, in the tape slot 16, the first end 12 of the channel 10 of the guide member 8.

The longitudinal member 4 in the form of an electric cable has been inserted into the first end 12 of the guide member 8 and the cable 4 has been displaced through the channel 10 in a direction from the first end 12 to the second end 14.

Hereby the adhesive tape 2 will be applied to the cable 4, yet still with its protective liner 3 attached.

Once a desirably length of the cable has been applied with adhesive 1, the adhesive tape 2 is cut and the cable 4 with the adhesive 1 covered by the protective liner 3 can be removed from the device 100.

Upon removing the protective liner 3, another adhesive surface 1*a* of the adhesive 1 will be exposed and the cable 4 can be adhered to a surface, wherever desired.

Figure 10:
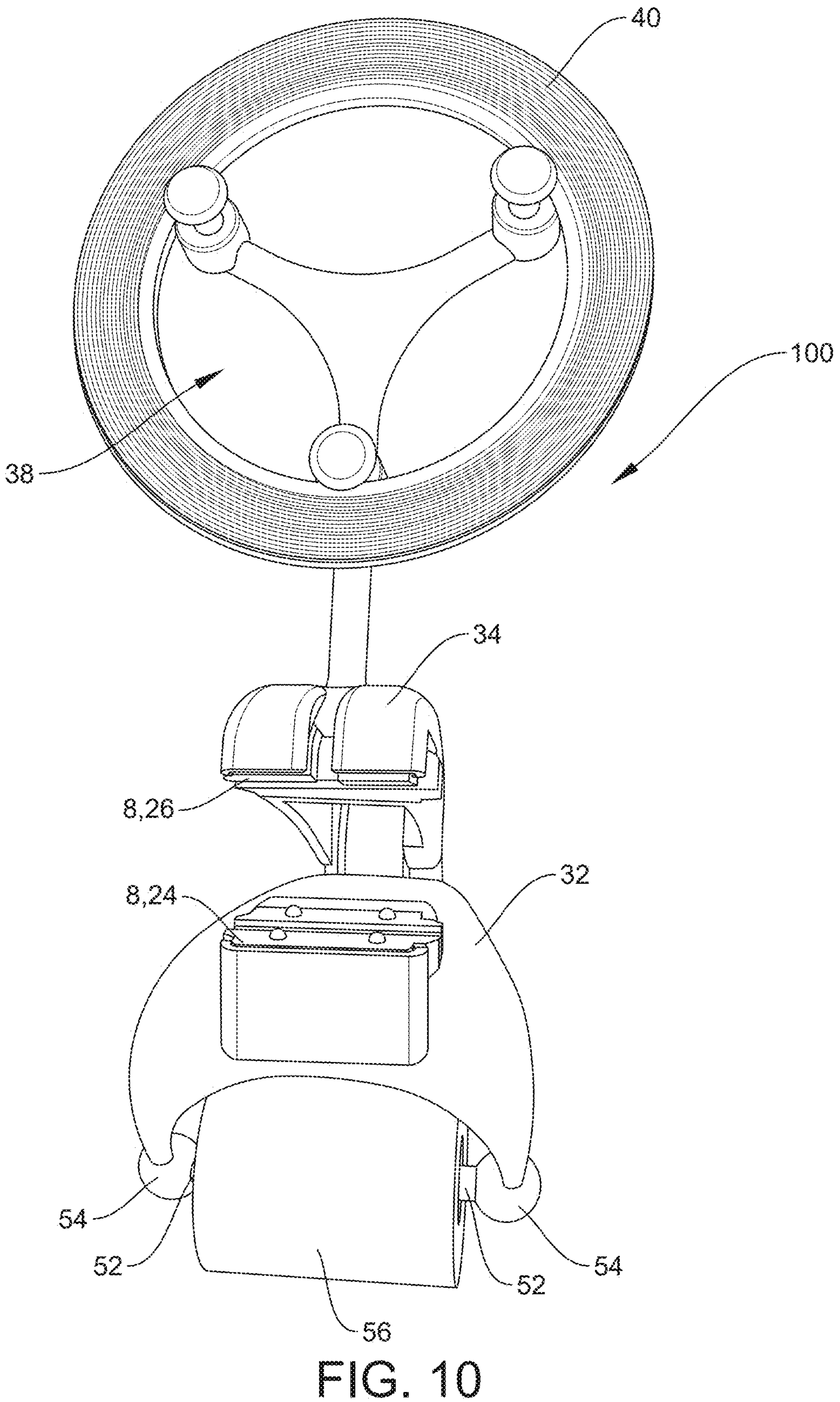
FIG. 10 is a photograph illustrating yet another embodiment of the device of the present invention.

FIG. 10 is a photograph illustrating the device 100 according to the first aspect of the present invention.

Figure 13:
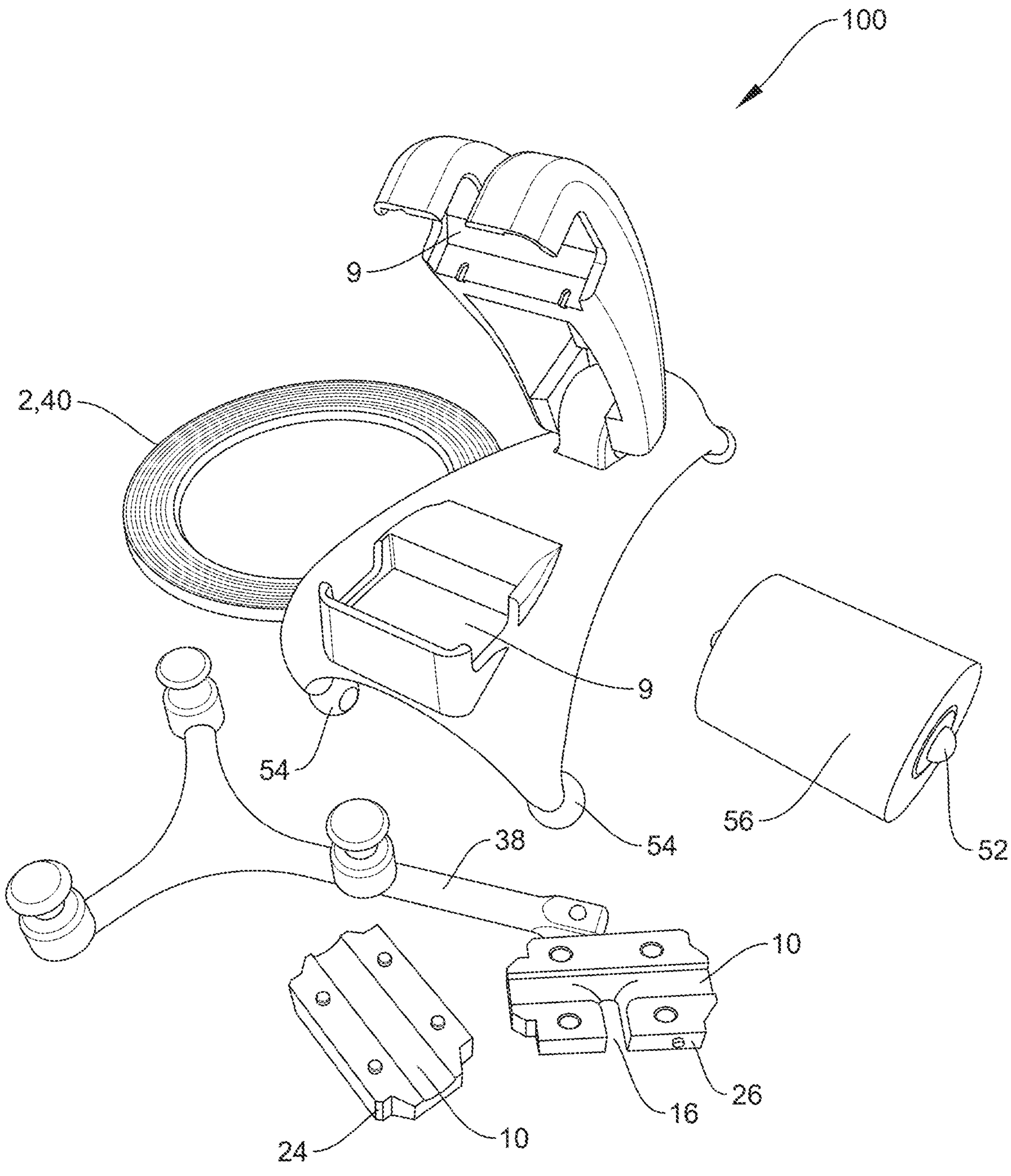
FIG. 13 is a photograph illustrating the device of the first aspect of the present invention in a disassembled state.

FIG. 10 shows that the device 100 has been provided with a roller 56. The roller 56 comprises first attachment means 52 which are configured to be clipped onto second attachment means 54 provided on the body 6 of the device 100. The first attachment means 52 are also seen in FIG. 13 and the second attachment means 54 are seen FIGS. 8, 9, 10 and 13.

Providing the device 100 with a roller enables application of pressure to the adhesive of the longitudinal product upon fastening that product to a surface.

Figure 11:
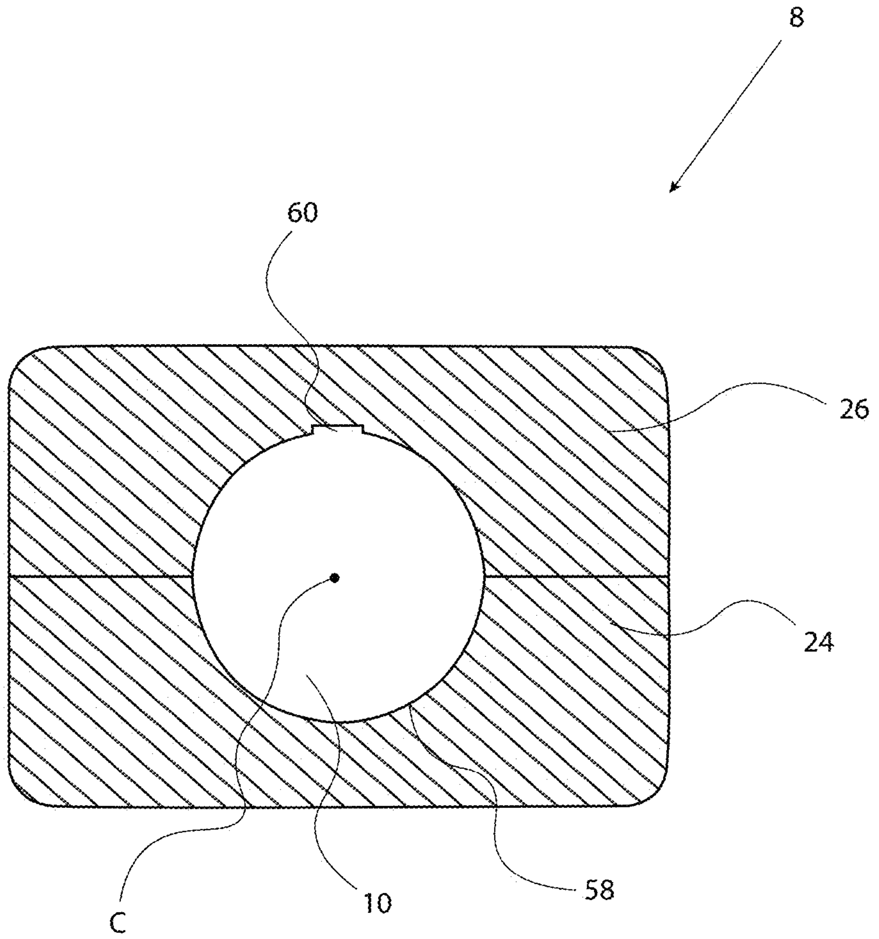
FIG. 11 is a cross-sectional view of an embodiment of the guide member of the device according to the present invention.

FIG. 11 is a cross-sectional view of an embodiment of the guide member of the device according to the present invention.

FIG. 11 shows that the cross-section of the channel 10 of the guide member 8 comprises an essential circular curve 58 comprising a notch 60. The notch 60 extends away from the center C of the circular curve and into the material of the guide member.

It is preferred that the notch 60 extends all the way along the channel 10 of the guide member 8 in a linear extension.

It is also preferred that the notch 60 is arranged at that longitudinal part of the surface of the channel 10 corresponding to the location of the tape slot 16.

Hereby, the longitudinal notch 60 will help guiding the location of application of an adhesive tape 2 upon using the device according to the invention on a cylindrical product 4 having a circular cross-section. Once an adhesive 2 tape is applied in a cylindrical product 4, that adhesive tape will take up the space defined by the notch 60 and thus prevent any rotation of the cylindrical product upon application of the adhesive tape. Thereby it is ensured that the adhesive tape 2 will be applied on the cylindrical product in a linear fashion, rather than being applied in a non-linear, such as a spiraling fashion.

Figure 12:
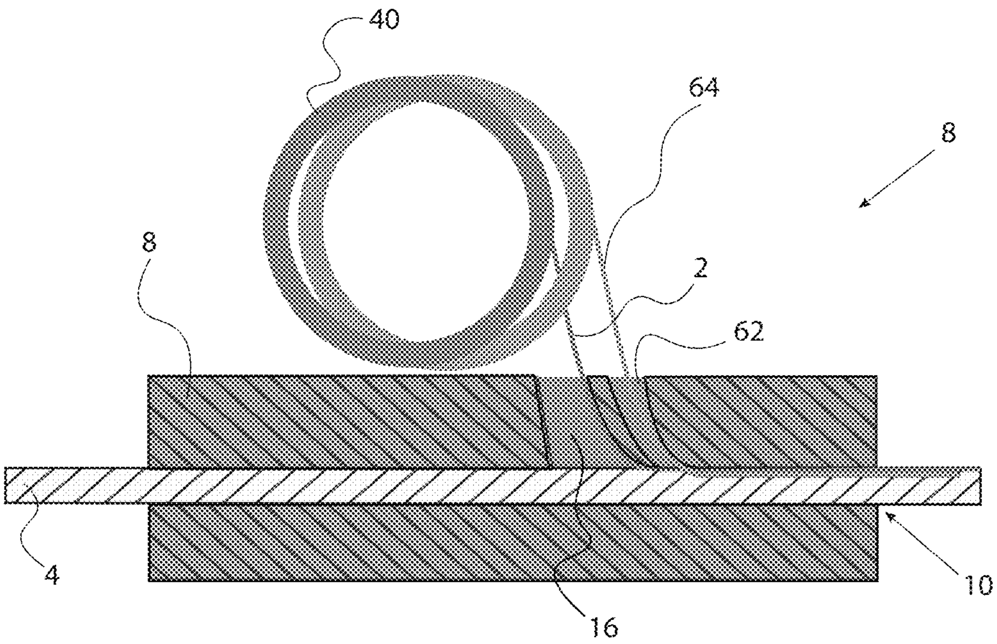
FIG. 12 is a cross-sectional view illustrating the principle of a special embodiment of the guide member of the device according to the invention.

FIG. 12 is a cross-sectional view illustrating the principle of a special embodiment of the guide member of the device according to the invention.

FIG. 12 shows the guide member 8 comprising a channel 10 and a tape slot 16 extending through the material of the guide member 8 into the channel 10. In the channel 10 a longitudinal product 4 has been inserted with the view to apply this product with an adhesive tape 2 originating from the reel 40.

FIG. 12 also shows that an auxiliary tape slot 62 has been provided in the guide member 8. The auxiliary tape slot 62 extends into the channel 10 through the material of the guide member 8 at a position next to the tape slot 16.

Hereby a protective tape 64 can be applied on top of the adhesive tape 2 which has been applied to the longitudinal product 4.

This embodiment is advantageous in case it is desired to provide a longitudinal member 4 with an adhesive tape, but which is intended for being stored for prolonged periods of time until use.

As moving around and subjecting the longitudinal member 4 including its applied adhesive tape 2 for various types of stresses may cause the protective liner 3 to bend and/or come lose it is advantageous to provide the longitudinal product with the protective tape 62 in order to prevent such situations.

FIG. 13 is a photograph illustrating the device 100 according to the first aspect of the present invention in a disassembled state. The various parts making up the device of the present invention may suitably be manufactured from plastic or metal, such as by molding or by 3D printing.

Figure 14:
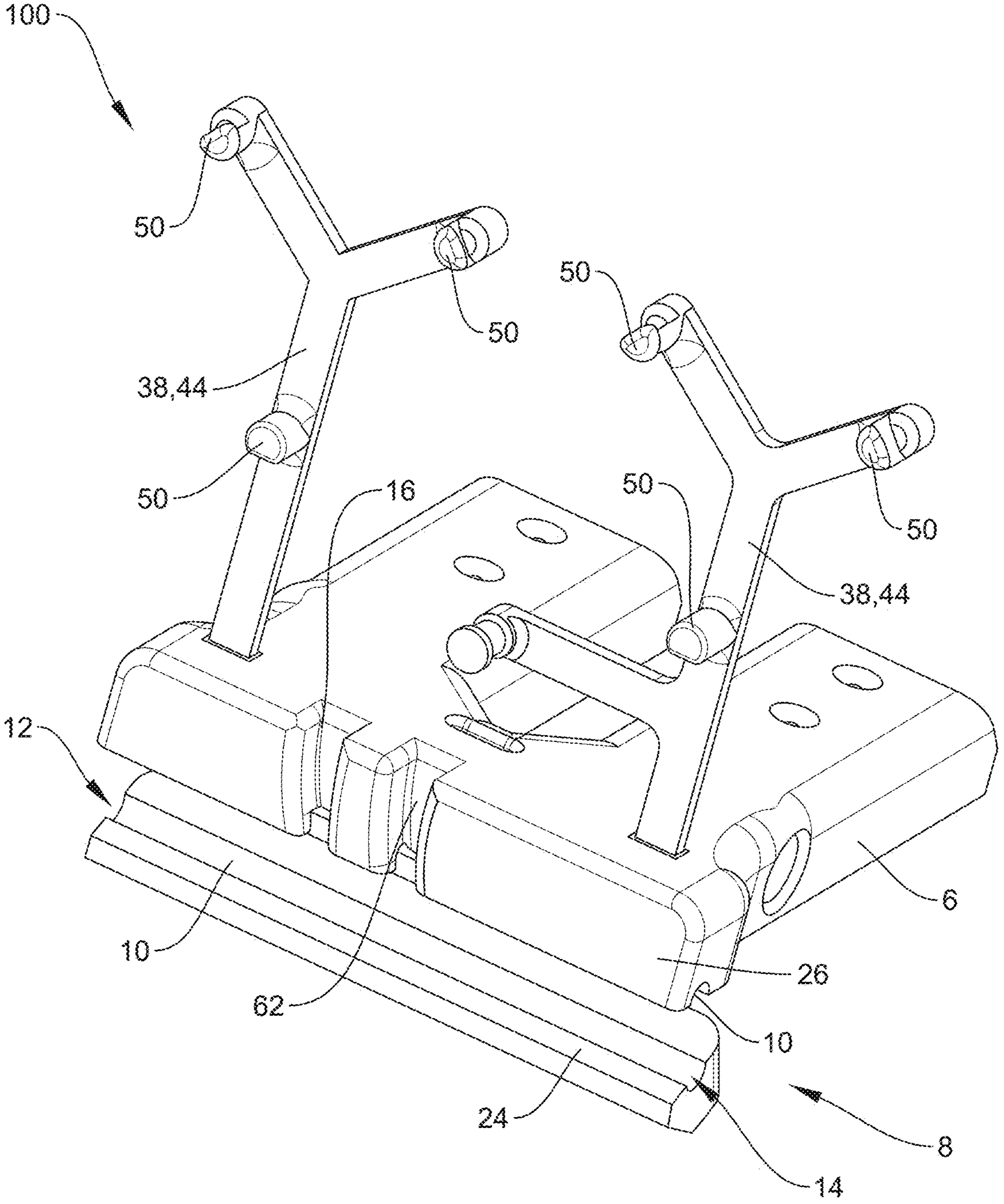
FIG. 14 is a perspective view illustrating an embodiment of the device according to the first aspect of the present invention comprising an auxiliary tape slot for a protective tape in addition to a tape slot for the adhesive tape to be applied to a longitudinal product as well as tape reel holders for these two types of tape.

FIG. 14 is a perspective view illustrating an embodiment of the device according to the first aspect of the present invention comprising an auxiliary tape slot for a protective tape in addition to a tape slot for the adhesive tape to be applied to a longitudinal product.

FIG. 14 accordingly shows the device 100 comprising a first guide member part 24 which is pivotally connected to the body 6 which integrated therewith comprises the second guide member part 26.

The guide member 6 comprising the first guide member part 24 and the second guide member part 26 comprises a tape slot 16 for an adhesive tape as well as auxiliary tape slot 62 for a protective tape to be applied on top of the adhesive tape onto a longitudinal product.

Also seen in FIG. 14 are two tape reel holders 38 for these two types of tape. The tape reel holders 38 comprise reel holding means 50.

It should be understood that all features and achievements discussed above and in the appended claims in relation to one aspect of the present invention and embodiments thereof apply equally well to the other aspects of the present invention and embodiments thereof.

LIST OF REFERENCE NUMERALS

1 Adhesive
1*a* First adhesive surface of adhesive
1*b* Second adhesive surface of adhesive
2 Adhesive tape
3 Protective liner of adhesive tape
4 Longitudinal product
6 Body of device
8 Guide member
9 Guide member area of body
10 Channel of guide member
12 First end of channel
14 Second end of channel
16 Tape slot
18 Inner guide surface of channel
20 Body attachment means
20*a* First body attachment means
20*b* Second body attachment means
22 Guide member attachment means
22*a* First guide member attachment means
22*b* Second guide member attachment means
24 First guide member part
26 Second guide member part
28 First guide member engagement means
30 Second guide member engagement means
32 First body member
33 Interphase between first guide member part and second guide member part and
34 Second body member
36 Pivoting point
38 Tape reel holder
40 Reel of adhesive tape
42 Plane defined by reel of adhesive tape
44 Post of tape reel holder
46 Proximal portion of post
48 Distal portion of post
50 Reel holding means
52 First roller attachment means

54 Second roller attachment means
56 Detachable roller
58 Circular curve of cross-section of channel of guide member
60 Longitudinal notch in channel of guide member
62 Auxiliary tape slot
64 Protective Tape
100 Device
200 System
300 Kit-of-parts
C Center of circular curve of cross-section of channel of guide member

The invention claimed is:

1. A device (100) for applying an adhesive (1) to a longitudinal product (4), said device comprises:

a body (6) comprising a guide member (8); wherein said guide member (8) comprises a channel (10) for receiving and guiding said longitudinal product in relation to said guide member, said channel (10) is having a first end (12) and a second end (14);

wherein said guide member (8) comprises a tape slot (16) for guiding an adhesive tape (2) into said channel (10);

wherein said channel (10) comprises a guide surface (18); and wherein said tape slot (16) extends through at least part of the material of said guide member (8) and into said guide surface (18) of said channel (10), thereby allowing feeding said adhesive tape (2) through the material of said guide member (8) and into said channel (10) of said guide member (8);

wherein said tape slot (16) is an open tape slot, extending into the channel (10) in a direction which is essentially perpendicular to an extension of the channel, wherein said tape slot is configured such that said adhesive tape can be inserted sideways into said channel (10) along the extension of said tape slot (16);

wherein said guide member (8) comprises a first guide member part (24) and a second guide member part (26); and wherein said guide member (8) is being divided into said first guide member part (24) and said second guide member part (26) which are separate and can be taken apart at an interface (33), said interface arranged along said channel (10), thereby intersecting said channel (10) along a longitudinal direction thereof.

2. A device (100) according to claim 1, wherein said channel (10) of said guide member (8) has an essentially linear extension.

3. A device (100) according to claim 1, wherein said channel (10) of said guide member (8) is a through channel extending through the material of said guide member; or is a channel (10) in a form of a recess arranged at a surface of said guide member.

4. A device (100) according to claim 1, wherein said guide member (8) is integrated with said body (6) of said device.

5. A device (100) according to claim 1, wherein said guide member (8) is configured to be detachable mounted to said body (6) of said device; optionally wherein said body (6) of said device comprises a body attachment means (20), and wherein said guide member (8) comprises guide member attachment means (22); wherein said body attachment means (20) and said guide member attachment means (22) are adapted to be able to detachably enter into engagement with each other, thereby enabling exchange of said guide member (8) on said body (6).

6. A device (100) according to claim 1, wherein said first guide member part (24) comprises a first guide member engagement means (28), and wherein said second guide member part (26) comprises a second guide member engagement means (30); wherein said first guide member engagement means (28) and said second guide member engagement means (30) are configured to detachably enter into engagement with each other.

7. A device (100) according to claim 1, wherein said body (6) comprises a first body member (32) and a second body member (34); wherein said first body member (32) and said second body member (34) are being attached to each other in a pivoting fashion around a pivoting point (36), thereby forming two jaws which, by rotation relative to each other, are configured to enable changing a configuration of said device between an open configuration and a closed configuration.

8. A device (100) according to claim 7, wherein said first body member (32) comprises first body attachment means (20*a*); and wherein said second body member (34) comprises second body attachment means (20*b*); wherein said first guide member part (24) comprises a first guide member attachment means (22*a*); wherein said second guide member part (26) comprises a second guide member attachment means (22*b*); wherein said first body attachment means (20*a*) is being configured to detachably enter into engagement with said first guide member attachment means (22*a*); and wherein said second body attachment means (20*b*) is being configured to detachably enter into engagement with said second guide member attachment means (22*b*); wherein said channel (10) thereby is being formed upon bringing said device into its closed configuration.

9. A device (100) according to claim 7, wherein said first body member (32) comprises first body attachment means (20*a*), wherein said first guide member part (24) comprises a first guide member attachment means (22*a*); wherein said first body attachment means (20*a*) is being configured to detachably enter into engagement with said first guide member attachment means (22*a*); and wherein said second guide member part (26) is integrated into said second body member (34).

10. A device (100) according to claim 7, wherein said first body member (32) and/or said second body member (34) comprises a longitudinal recess, thereby forming said guide member (8) as an integral part of said body (6); wherein said recess(es) thereby define(s) said channel (10), when said first body member (32) and said second body member (34) are being brought into their closed configuration; optionally wherein said first body member (32) and said second body member (34) comprises engagement means (28,30) configured to enter into engagement with each other upon bringing said first body member (32) and said second body member (34) into their closed configuration, thereby preventing any lateral movement of the first body member (32) and said second body member (34) relative to each other when being in their closed configuration.

11. A device (100) according to claim 1, wherein said channel (10) is having a cross-sectional geometry selected from the group of geometries of: a circle, an oval, a triangle, and a rectangle.

12. A device (100) according to claim 1, wherein a cross-section of said channel (10) of said guide member (8) comprises an substantially circular curve (58) comprising a notch (60), wherein said notch extends away from the center (C) of said circular curve and into the material of said guide member (8); optionally wherein said notch (60) extends all the way along the longitudinal direction of said channel (10); or optionally wherein said notch (60) is arranged at that longitudinal part of the surface of said channel (10) corresponding to the location of an entry of said tape slot (16).

13. A device (100) according to claim 1, wherein said device furthermore comprises a tape reel holder (38) for holding a reel (40) of adhesive tape (2); optionally wherein said tape reel holder (38) is having an orientation, relative to said tape slot (16) of said guide member (8) in a way enabling that once being loaded with said reel of adhesive tape (2), said reel (40) of adhesive tape defines a plane which essentially intersects said tape slot (16).

14. A device (100) according to claim 13, wherein said tape reel holder (38) comprises a post (44) having a proximal portion (46) and a distal portion (48), wherein said proximal portion is being attached to said body (6) of said device and wherein said distal portion comprises reel holding means (50), wherein said reel holding means is configured to allow a tape reel (40), once being mounted on said tape reel holder (38), to rotate relative to said post.

15. A device (100) according to claim 1, further comprising a roller (56), wherein said roller comprises first roller attachment means (52), and wherein said body (6) comprises second roller attachment means (54), wherein said first roller attachment means (52) are configured to detachably enter into engagement with said second roller attachment means (54).

16. A device (100) according to claim 1, wherein said guide member (8) comprises an auxiliary tape slot (62) for guiding a protective tape (64) into said channel (10), said auxiliary tape slot (62) extends through the material of the guide member (8) into said channel (10) at a position next to the said tape slot (16); optionally wherein said device (100) further comprising a tape reel holder for said protective tape (64).

17. A system (200) comprising a device (100) according to claim 1 in combination with a set of two or more guide members (8), wherein each of said two or more guide members the channel (10), and wherein the geometries and/or dimensions of said channels are different.

18. A kit-of parts (300) comprising a device (100) according to claim 1 in combination with one or more reels (40) of adhesive tape (2); and wherein the geometry and the dimensions of said adhesive tape (2) is adapted to the geometry and the dimensions of the tape slot (16) of said guide member (8) of said device; optionally further in combination with one or more reels of protective tape (64).

19. A method for applying an adhesive (1) to a longitudinal product (4), wherein said method comprises the following steps:

i) providing a device (100) according to claim 1;

ii) via said tape slot (16) inserting an end of the adhesive tape (2) into the channel (10) of the guide member (8) of said device in such a way that exposed adhesive (1) of said adhesive tape (2), upon entering said channel (10), faces said first end (12) of said channel (10);

iii) arranging said longitudinal product (4) in said channel (10) of said guide member (8);

iv) displacing said longitudinal product (4) along said channel (10) of said guide member (8), in a direction from said first end (12) of said channel to said second end (14) of said channel, thereby making said exposed adhesive (1) of said adhesive tape (2) adhere to said longitudinal product (4) along a desired extension thereof; and v) cutting the adhesive tape (2), once the desired extension of application has been reached.

* * * * *